United States Patent [19]

Hoeschele

[11] 3,723,568
[45] Mar. 27, 1973

[54] SEGMENTED THERMOPLASTIC COPOLYESTERS MODIFIED WITH POLYEPOXIDES

[75] Inventor: Guenther Kurt Hoeschele, Wilmington, Del.

[73] Assignee: E. I. du Pont de Nemours and Company, Wilmington, Del.

[22] Filed: Feb. 28, 1972

[21] Appl. No.: 230,045

[52] U.S. Cl. ............260/835, 260/40 R, 260/45.9 R, 260/47 R, 260/75 R, 260/830 R, 260/860
[51] Int. Cl. ...........................................C08g 45/14
[58] Field of Search...........................260/830 R, 835

[56] References Cited

UNITED STATES PATENTS

| | | | |
|---|---|---|---|
| 2,890,196 | 6/1959 | Phillips | 260/835 |
| 2,890,197 | 6/1959 | Phillips | 260/835 |
| 2,935,488 | 5/1960 | Phillips | 260/835 |
| 3,297,782 | 1/1967 | Barkis | 260/835 |
| 3,378,497 | 4/1968 | Lanham | 260/830 R |
| 3,397,254 | 8/1968 | Wynstra | 260/835 |
| 3,670,045 | 6/1972 | Koleske | 260/830 R |

FOREIGN PATENTS OR APPLICATIONS 872,254   7/1961   Great Britain.....................260/835

Primary Examiner—Paul Lieberman
Attorney—Michael Conner

[57] ABSTRACT

A thermoplastic copolyester composition comprising: (a) at least one segmented copolyester polymer consisting essentially of (1) about 5–85 weight percent of recurring long-chain ester units derived from at least one dicarboxylic acid having a molecular weight below about 300 and at least one poly(alkylene oxide) glycol having a molecular weight between about 400–6,000 and a carbon to oxygen ratio of about 2.0–4.3 and (2) 15–95 weight percent short-chain ester units which are derived from at least one low molecular weight diol having a molecular weight of less than about 250 and at least one dicarboxylic acid having a molecular weight of less than about 300, and (b) from 0.5–10 equivalents, per equivalent of carboxyl group contained in said copolyester of a polyepoxide having a functionality of not less than about 2.

16 Claims, No Drawings

SEGMENTED THERMOPLASTIC COPOLYESTERS MODIFIED WITH POLYEPOXIDES

BACKGROUND OF THE INVENTION

Linear copolyesters or copolyetheresters have been produced heretofore for various purposes, particularly for the production of films and fibers, but the known polymers of this type have not been as effective as would be desired for certain applications. In particular, certain polymers of this type which possess very desirable properties such as superior tear strength, tensile strength, flex life and abrasion resistance may, for particular designated uses, have to be improved with regard to a characteristic such as melt stability. Melt stability may be defined as resistance toward polymer degradation during processing in the molten state. Improved melt stability is required when processing temperatures are raised significantly above polymer melt temperature and/or when processing requires that the polymer be held above its melting point for extended periods of time. In filling large molds by injection molding or rotational casting, high processing temperatures (up to 30°–50°C. above normally recommended temperatures) are needed to lower polymer melt viscosity. Under these conditions, conventional copolyetherester polymers degrade at a relatively high rate. The degradation is evidenced by lower inherent viscosity and higher melt index and results in a reduction of polymer physical properties such as tear and tensile strengths as well as flex life. Thus, for uses such as molding a large object, e.g., an airplane tire, superior melt stability is a necessity.

In addition, there are instances where it is desirable to increase the molecular weight of a copolyetherester to improve its physical properties. While it is generally possible to prepare copolyetheresters of high molecular weight by known procedures, expensive continuous polycondensation equipment capable of handling high viscosity polymer melts is required and the output of such equipment is limited. By producing intermediate molecular weight polymer, less expensive equipment such as batch reactors can be used and/or output can be increased. The low melt viscosity of intermediate molecular weight polymers can also be an advantage in processing on occasion but means for eventually increasing the molecular weight of the polymer must be available.

SUMMARY OF THE INVENTION

According to this invention there is provided an improved thermoplastic copolyester polymer which possesses superior melt stability; optionally, the molecular weight of the polymer can be increased. A process for making such a thermoplastic elastomer is also intended to be part of this invention. In order to produce such an improved thermoplastic copolyester composition a polyepoxide having a functionality of not less than two must be included in the polymer.

The thermoplastic copolyester which is to be improved by the instant invention consists essentially of a multiplicity of recurring intralinear long-chain and short-chain ester units connected head-to-tail through ester linkages, said long-chain ester units being represented by the following structure:

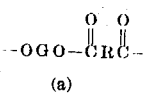

(a)

and said short-chain ester units being represented by the following structure:

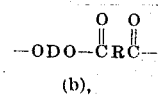

(b), wherein:

G is a divalent radical remaining after removal of terminal hydroxyl groups from poly(alkylene oxide) glycols having a carbon-to-oxygen ratio of about 2.0–4.3 and molecular weight between about 400 and 6,000;

R is a divalent radical remaining after removal of carboxyl groups from a dicarboxylic acid having a molecular weight less than about 300; and D is a divalent radical remaining after removal of hydroxyl groups from a low molecular weight diol having a molecular weight less than about 250, with the provisos that the short-chain ester units constitute about 15–95 percent by weight of the copolyester and, ergo, the long-chain ester units constitute about 5 to 85 percent by weight of the copolyester; at least about 50 percent of the short-chain ester units must be identical and a homopolymer in the fiber-forming molecular weight range (>5,000) consisting of the identical short-chain ester units must melt at, at least, 150°C.

The copolyester is modified by adding to it, after it is formed about 0.5–10 equivalents per equivalent of carboxyl group contained in the copolyester of a polyepoxide having a functionality of not less than about two.

The polyepoxide used has an epoxide equivalent of about 50–2,000 and may be depicted by the general formula:

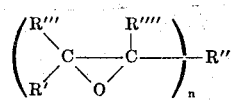

where $n$ has a value of about 2 to 15, $R'$, $R'''$ and $R''''$ are independently hydrogen or lower alkyl, e.g., $C_1$ to $C_4$ and $R''$ is a polyvalent radical containing only the elements of C, H and O with the exception that carbocyclic aromatic nuclei contained in $R''$ may be substituted with Cl or Br. $R'$ and $R''$ may also be joined to form a 5 or 6 membered carbocyclic ring.

In an embodiment of the instant invention an epoxy catalyst may also be added to the copolyester.

DETAILED DESCRIPTION

The term "long-chain ester units" as applied to units in a polymer chain refers to the reaction product of a long-chain glycol with a dicarboxylic acid. Such "long-chain ester units," which are a repeating unit in the copolyesters of this invention, correspond to formula (a) above. The long-chain glycols are polymeric glycols having terminal (or as nearly terminal as possible) hydroxy groups and a molecular weight from about 400–6,000. The long-chain glycols used to prepare the copolyesters of this invention are poly(alkylene oxide) glycols having a carbon-to-oxygen ratio of about 2.0–4.3.

Representative long-chain glycols are poly(ethylene oxide) glycol, poly(1,2- and 1,3-propylene oxide) glycol, poly-(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3).

The term "short-chain ester units" as applied to units in a polymer chain refers to low molecular weight compounds or polymer chain units having molecular weights less than about 550. They are made by reacting a low molecular weight diol (below about 250) with a dicarboxylic acid to form ester units represented by formula (b) above.

Included among the low molecular weight diols which react to form short-chain ester units are acyclic, alicyclic, and aromatic dihydroxy compounds. Preferred are diols with 2–15 carbon atoms such as ethylene, propylene, tetramethylene, pentamethylene, 2,2,dimethyltrimethylene, hexamethylene, and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids which are reacted with the foregoing long-chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis-(cyclohexane carboxylic acid), 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, p-oxy(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$–$C_{12}$ alkyl and ring substitution derivatives thereof, such as halo, alkoxy, and aryl derivatives. Hydroxyl acids such as p($\beta$-hydroxyethoxy) benzoic acid can also be used providing an aromatic dicarboxylic acid is also present.

Aromatic dicarboxylic acids are an especially preferred class for preparing the copolyetherester polymers of this invention. Among the aromatic acids, those with 8–16 carbon atoms are preferred, particularly the phenylene dicarboxylic acids, i.e., phthalic, terephthalic and isophthalic acids and their dimethyl derivatives.

It is essential that at least about 50 percent of the short segments are identical and that the identical segments form a homopolymer in the fiber-forming molecular weight range (molecular weight > 5,000) having a melting point of at least 150°C. and preferably greater than 200°C. Polymers meeting these requirements exhibit a useful level of properties such as tensile strength and tear strength. Polymer melting points are conveniently determined by differential scanning calorimetry.

The short-chain ester units will constitute about 15–95 weight percent of the copolyesters. The remainder of the copolyester will be the long segments, ergo the long segment will comprise about 5–85 weight percent of the copolyester.

The carboxyl group content of the polymer is a maximum of 100 milliequivalent per kilogram, and is preferably about 15–75 milliequivalents per kilogram.

The copolyester is modified by the presence of a polyepoxide having at least two functional groups; optionally, in an embodiment of the instant invention an epoxy catalyst may be added to the modified copolyester to increase the rate of reaction of the epoxy groups with the carboxyl groups of the copolyester. The addition of catalyst is particularly beneficial in those instances where it is desired to increase the molecular weight of a polyester significantly through chain-extension or cross-linking.

The polyepoxide having a functionality of at least two is added to the copolyester in the amount of 0.5–10 epoxy equivalents for each equivalent of carboxyl group contained in the copolyester preferably 1.0–5.0 equivalents for each equivalent of carboxyl group and

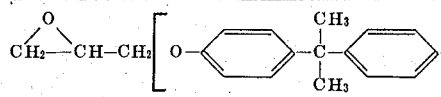

most preferably 1.5 to 4.0 equivalents for each equivalent of carboxyl group.

Any polyepoxide having a functionality of at least two may be utilized for modifying the copolyester of the instant invention. It is preferred however to use polyepoxides having the following general formula:

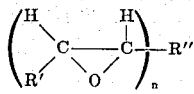

where $n = 2$–$10$ and $R'$ and $R''$ have the meanings given hereinbefore and the polyepoxide has an epoxide equivalent of 75–1,000. Epoxide compounds obtained by epoxidation of olefins or by reaction of epihalohydrins with active hydrogen compounds are useful in the present compositions.

Representative polyepoxides obtained by epoxidation include vinylcyclohexene dioxide, bis(2,3-epoxycyclopentyl) ether, 3,4-epoxycyclohexylmethyl, 3,4-epoxycyclohexane carboxylate, bis(3,4-epoxy-6-methylcyclohexylmethyl) adipate, 3-(3,4-epoxycyclohexane)-8,9-epoxy-dioxaspiro[5.5]-undecane, epoxidized butadiene and epoxidized natural oils.

Epoxides prepared from epiholohydrins and active hydrogen compounds; that is, polyglycidyl compounds; are preferred for use in the present compositions. These polyepoxides may be represented by the general formula:

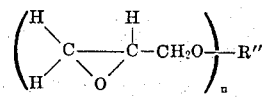

where $n$ is 2–10 and $R''$ has the meaning given hereinbefore and the polyepoxide has an epoxide equivalent of 75–750. Representative polyepoxides of this type include those prepared by reaction of epichlorohydrin with polyhydric phenols such as 4,4'-isopropylidene diphenol (bisphenol A), tetrabromobisphenol A, resorcinol, hydroquinone, pyrogallol, 4,4'-methylenebis(phenol) and polyphenols derived from phenol or o-cresol and an aldehyde (novolacs). Other suitable polyepoxides include reaction products of epichlorohydrin and aliphatic compounds containing 2 to 6 alcoholic hydroxyl groups such as ethylene glycol, butanediol-1,4, poly(alkylene oxide) glycols and triols, glycerol, 1,2,6-hexanetriol, pentaerythritol and sorbitol. Polyglycidyl esters of polycarboxylic acids such as adipic acid, succinic acid, phthalic acid and mellitic acid are also representative of suitable polyepoxides.

Certain individual polyepoxides having at least two functionalities are particularly preferred in the instant invention. They include diglycidyl ethers of bisphenol A having the following structure:

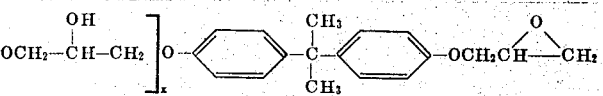

where $\chi$ is to zero to 5 and the polyglycidyl ethers of phenolformaldehyde novolacs having the following structure:

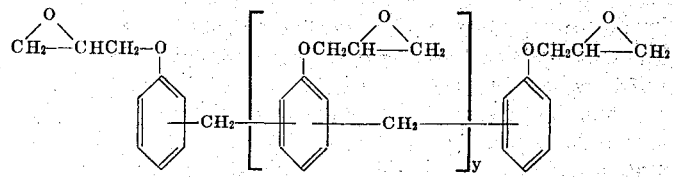

where $y$ is 1 to 6.

The polyepoxide is added to the copolyester by mixing at elevated temperatures near the softening point or melting point of the copolyetherester in equipment such as rubber mills, extruders and internal mixers (Banbury mixer).

In an embodiment of the instant invention from 0.05–0.5 weight percent of an epoxy catalyst based on the weight of copolyester may also be added. Preferably from 0.1 to 0.3 weight percent of the epoxy catalyst is added to the copolyester.

Suitable epoxy catalysts which may be utilized include secondary aliphatic amines such as dibutylamine N-methylcyclohexylamine, N-methylpiperazine, piperidine, pyrrolidine and 4,4'-dipiperidine; tertiary aliphatic amines such as N,N-dimethylbenzylamine, N,N-dimethylcyclohexylamine, N,N'-dimethylpiperazine, N-ethylmorpholine, N-methylpiperidine and triethylene diamine; metallic salts of organic acids such as calcium stearate, zinc naphthenate, sodium acetate, stannous octoate and lead naphthenate; and metal halide Lewis acids and their complexes such as boron trifluoride, zinc chloride, stannic chloride, boron trifluoride-piperidine-complex and boron trifluoride-monoethanolamine complex.

Of these catalysts, the secondary aliphatic amines are preferred and higher boiling secondary amines having boiling points approaching or exceeding the melting point of the copolyester are especially preferred because they are largely retained during mixing with the copolyetheresters. 4,4'-Trimethylenedipiperidine has been found to be especially effective and convenient to use in the present compositions.

The presence of the epoxy catalyst serves to increase the rate of chain-extension and/or cross-linking which is believed to result from reaction of epoxide groups with carboxyl groups present in the copolyester. In the absence of a catalyst, the copolyester and the polyepoxide interact at temperatures above the melting point of the copolyester at rates which in general approach or about match the rate of degradation of the copolyester. As a result, the melt index of the copolyester with the polyepoxide increases slowly or remains about unchanged with time. In the presence of a catalyst, the rate of reaction of the epoxide with the molten copolyester can be increased significantly relative to the rate of copolyester degradation, with the result that the melt index decreases as a function of time. Variables such as the carboxyl content of the copolyester, the melt stability of the copolyester, the functionality and reactivity of the epoxide compound and catalyst concentration effect the results obtained in a manner consistent with the reactions which are believed to occur in the epoxide/copolyester compositions.

Because the interaction of the polyepoxide and the copolyester is relatively slow, it is possible to melt blend the polyepoxide and copolyester, even in the presence of a catalyst, and to form the blend into finished articles by molding or extrusion for instance and further cure (chain-extend and/or cross-link), the resulting articles at temperatures of 100°–150°C. When epoxides having a higher functionality are used, curing can result in the formation of highly cross-linked copolyesters which are thermosetting and have outstandingly high modulus characteristics for a given hardness.

Most preferred segmented copolyesters for use in this invention are those prepared from dimethyl terephthalate, 1,4-butanediol, and poly(tetramethylene oxide) glycol having a molecular weight of about 600–2,000 or poly(ethylene oxide) glycol having a molecular weight of about 600–1,500. Optionally, up to about 30 mole percent and preferably 5–20 mole percent of the dimethyl terephthalate in these polymers can be replaced by dimethyl phthalate or dimethyl isophthalate. Other preferred copolyesters are those prepared from dimethyl terephthalate, 1,4-butanediol, and poly(propylene oxide) glycol having a molecular weight of about 600–1,600. Up to 30 mole percent and preferably 10–25 mole percent of the dimethyl terephthalate can be replaced with dimethyl isophthalate or butanediol can be replaced with neopentyl glycol until up to about 30 percent and preferably 10–25 percent of the short-chain ester units are derived from neopentyl glycol in these poly(propylene oxide) glycol polymers. The polymers based on poly(tetramethylene oxide) glycol are especially preferred because they are easily prepared, have overall superior physical properties, and are especially resistant to water.

The dicarboxylic acids or their derivatives and the polymeric glycol are incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of diols present, their boiling points, and relative reactivities. The total amount of glycol incorporated is still the difference between moles of diacid and polymeric glycol.

The polymers described herein can be made conveniently by several different methods. Initially, the ester interchange between the dicarboxylic acid ester and the low molecular weight diol and poly(alkylene oxide) glycol must take place. Following this interchange which produces the copolyester product, the polyepoxide is added to the copolyetherester. The polyepoxide cannot be added prior to the completion of the ester interchange because at the very high temperatures encountered in the final stage of the interchange in the presence of an ester interchange catalyst, the polyepoxide rapidly cross-links the copolyester and raises its melt viscosity to levels which interfere with or prevent operation of the equipment. Polyepoxides behave under these conditions like polyols and each epoxide function corresponds to two hydroxyl groups.

The polyepoxide can be added to the finished copolyester and melt blended with a mix screw for instance while it is still in the molten state and prior to cooling or quenching. Alternatively, the polyepoxide may be added subsequently by remelting the finished copolyester. A particularly convenient means of adding solid polyepoxides involves dry blending the polyepoxide with copolyester pellets and passing the dry blend through an extruder or injection molding machine. In this manner melt blending can be combined with extrusion or injection molding forming steps.

If an epoxy catalyst is to be added, it can be added with the polyepoxide, but is preferably added after the polyepoxide has been at least partially melt blended with the copolyester. The catalyst should not be added to the copolyester in the absence of the polyepoxide as this can cause copolyester degradation. In instances where the epoxide is added to the molten copolyester emerging from the copolyester process, it is usually desirable not to add catalyst at this point. Instead, catalyst can be conveniently mixed with the copolyester as it is being used in operations such as injection molding or extrusion.

In more detail, the polymers described herein can made conveniently by starting with a conventional ester interchange reaction. A preferred procedure involves heating the dimethyl ester of terephthalic acid with a long-chain glycol and a molar excess of 1,4-butanediol in the presence of a catalyst of 150°–260°C. while distilling off methanol formed by the ester interchange. Depending on temperature, catalyst, glycol excess, and equipment, this reaction can be completed within a few minutes to a few hours. This procedure results in the preparation of a low molecular weight prepolymer which can be carried to a high molecular weight copolyester of this invention by the procedure described below. Such prepolymers can also be prepared by a number of alternate esterification or ester interchange processes; for example, the long-chain glycol can be reacted with a high or low molecular weight short-chain ester homopolymer or copolymer in the presence of catalyst until randomization occurs. The short-chain ester homopolymer or copolymer can be prepared by ester interchange from either the dimethyl esters and low molecular weight diols, as above, or from the free acids with the diol acetates. Alternatively, the short-chain ester copolymer can be prepared by direct esterification from appropriate acids, anhydrides, or acid chlorides, for example, with diols or by other processes such as reaction of the acids with cyclic ethers or carbonates. Obviously, the prepolymer might also be prepared by running these processes in the presence of the long-chain glycol.

The resulting prepolymer is then carried to high molecular weight by distillation of the excess of short-chain diol. This process is known as "polycondensation."

Additional ester interchange occurs during this polycondensation or distillation; the distillation serves to increase the molecular weight and to randomize the arrangement of the copolyester units. Best results are usually obtained if this final distillation or polycondensation is run at less than 1 mm. Hg pressure and 240°–260°C. for less than 2 hours, e.g., 0.5 to 1.5 hours in the presence of antioxidants such as sym-di-beta-naphthyl-p-phenylenediamine and 1,3,5-trimethyl-2,4,6-tris[3,5-ditertiarybutyl-4-hydroxybenzyl] benzene. Most practical polymerization techniques rely upon ester interchange to complete the polymerization reaction. In order to avoid excessive hold time at high temperatures with possible irreversible thermal degradation, a catalyst for the ester interchange reaction should be employed. While a wide variety of catalysts can be used organic titanates such a tetrabutyl titanate used alone or in combination with magnesium or calcium acetates are preferred. Complex titanates, such as $Mg[HTi(OR)_6]2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol in terphenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers. Both batch and continuous methods can be used for any stage of copolyester polymer preparation. Polycondensation of prepolymer can also be accomplished in the solid phase by heating divided solid prepolymer in a vacuum or in a stream of inert gas to remove liberated low molecular weight diol. This method has the advantage of reducing degradation because it must be used at temperatures below the softening point of the prepolymer.

The properties of these copolyetheresters can be modified by incorporation of various conventional inorganic fillers such as carbon black, silica gel, alumina, clays, and chopped fiberglass. In general, these additives have the effect of increasing the modulus of the material at various elongations. Compounds having a range of hardness values can be obtained by blending hard and soft polyesters of this invention.

Following the formation of copolyester and while it is still in the molten state being maintained at a temperature of about 150° to 275°C about 0.5–10.0 equivalents preferably 1.0–5.0 equivalents per equivalent of carboxyl group of the polyester, of a polyepoxide having a functionality of not less than about two can be added to the copolyester. It should be noted that at that point the copolyester polymer has a molecular weight corresponding to an inherent viscosity of about 1.0 to 1.5. The polyepoxide can be added by metering it and the molten copolyester into a mix screw after which, the resulting blend should be cooled or quenched. As previously mentioned, the finished copolyester can be quenched and the epoxide can be added at a later time by remelting the copolyester.

The resulting product, that is to say the copolyester polymer modified with the polyepoxide, having a functionality of at least two has the following improved characteristics as compared to the nonmodified polyester polymer. In the absence of a catalyst the polyepoxide modified copolyesters have improved melt stability so that processing of the molten copolyester can be accomplished at higher temperatures than would normally be acceptable. In the presence of catalysts, the modified copolyester can be chain-extended and/or cross-linked to such an extent that significant improvements in physical properties such as tensile and tear strength and flex life are observed. The modified copolyesters, preferably with catalysts, are also useful in preparing hot-melt adhesives because of their outstanding melt stability and the adhesion-promoting character of the polyepoxide.

All parts, proportions and percentages disclosed herein are by weight unless otherwise indicated. The following examples further illustrate the invention:

Test Procedures

The following ASTM methods are used in determining the properties of the polymers in the examples:

| | |
|---|---|
| Tensile Strength | |
| Elongation at Break | |
| Permanent Set at Break | |
| 100% Modulus | D412* |
| 300% Modulus | |
| 500% Modulus | |
| Shore D Hardness | D1484 |
| Trouser Tear | D470** |
| Melt Index | D1238 |

* Cross-head speed 20 inches/minute
** Modified by use of 1.5 × 3 sample with 1.5 inch cut on the long axis of the sample. This configuration avoids "necking down" of the sample at the point of tearing. Cross-head speed 50 inches/minute.

Inherent viscosities of the polymers in the following examples are measured at 30°C. at a concentration of 0.1g./dcl. in m-cresol.

The carboxyl group content can be determined by dissolving the copolyester in cresol, adding water and chloroform, and titrating the solution with standardized ethanolic potassium hydroxide. The end point is determined by potentiometry.

EXAMPLES

Copolyester A is prepared by ester interchange of 4.84 moles of dimethyl terephthalate hereinafter (DMT), 1.41 moles of dimethyl isophthalate hereinafter (DMI), 1.0 mole of polytetramethyleneether glycol hereinafter (PT-MEG-980) (having a number average molecular weight about 980) and excess 1,4-butanediol in the presence of a tetrabutyl titanate/magnesium acetate catalyst and a stabilizer [sym-di-beta-naphthyl-phenylene diamine]. Ester interchange is conducted at atmospheric pressure up to a final temperature of 220°C. The ester interchange is followed by polycondensation at 250°C. at less than 1 mm. Hg for about 90 minutes. The resulting polymer has a melt index of 11.4 measured at 250°C. which corresponds to an inherent viscosity of about 1.72 and contains about 27.2 milliequivalents of carboxyl groups per kilogram (kg.) of polymer.

Copolyester B is prepared by ester interchange of 7.85 moles of DMT, 1 mole PTMEG-980 and excess 1,4-butanediol using the ester interchange conditions and catalyst and stabilizer described for the preparation of Copolyester A. Polycondensation is performed at 250°C. for about 5 hours under reduced pressure. At the end of the finishing cycle the pressure was about 5 mm. Hg. The resulting polymer had a melt index of 48.8 measured at 220°C. and a carboxyl content of 73.9 milliequivalents/kg.

Copolyester C is prepared from the same molar amounts of DMT, PTMEG-980 and 1,4-butanediol as used for the preparation of Copolyester B. The ester interchange and polycondensation reaction is effected under the same conditions and in the presence of the same stabilizer and catalyst as described for the preparation of Copolyester A. The resulting polymer had a melt index of 6.7 (measured at 220°C.) and carboxyl content of 27.9 milliequivalents/kg.

Catalyst A

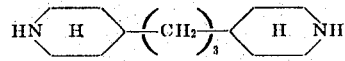

Example 1

Polyepoxide A is mixed with Copolyester A in the amounts tabulated below. The compounding is effected by milling on a steam-heated rubber mill at 165°–170 °C. for 5 minutes. In experiment 1B the catalyst was added after the polyepoxide was milled into the polymer for a few minutes.

|  | 1A | 1B | 1C | 1D |
|---|---|---|---|---|
| Copolyester A (parts) | 100 | 100 | 100 | 100 |
| Polyepoxide A (parts) | 2.0 | 1.0 | - | - |
| Catalyst A (parts) | - | 0.15 | 0.3 | - |

In control experiment 1D Copolyester A was milled without polyepoxide or catalyst addition to give the polymer the same heat history.

To determine the melt stability of polymer compositions 1A to D under conditions similar to those during processing 7.5 g. samples of shredded polymer of each composition were dried at 135°C/0.05 mm. Hg. for 1 hour and then charged to a melt index apparatus (available from F. F. Slocomb, Wilmington, Del.) heated at 250°C. The change of melt index was then determined as a function of time. The initial melt index was determined 5 minutes after charging the polymer to the melt indexer. The results are summarized below:

| Composition | Initial melt index (250°C) | Melt index 250°C (after 60 min. at 250°C) | % Change |
|---|---|---|---|
| 1A | 11.9 | 17.24 | +45.0 |
| 1B | 11.6 | 10.0 | −13.8 |
| 1C | 26.8 | 48.0* | +79.0* |
| 1D | 11.4 | 25.6 | +224.5 |

*Melt index determined after 10 minutes at 250°C.

|  | Equivalent weight * |
|---|---|
| Polyepoxide A 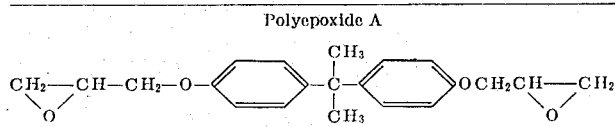 | 185-192 |
| Polyepoxide B  | 91-102 |
| Polyepoxide C 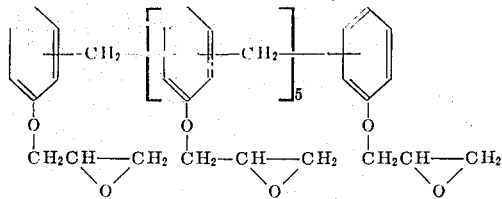 | 190-220 |

* Range of equivalent weight for commercially available material approximating the indicated structure.

Since the melt index is inversely proportional to the melt viscosity a plus change means a decrease of molecular weight due to polymer degradation. It is evident that Composition 1A containing Polyepoxide A exhibits significantly better melt stability under these conditions than Control polymer 1D. In the presence of amine catalyst the polyepoxide is even more effective and the molecular weight of the copolyester actually increased slightly as indicated by the negative change of melt index (Composition 1B). This is surprising in view of the fact that the amine catalyst alone has a very detrimental effect on the melt stability of the polymer (Composition 1C).

Example 2

About 1.0 part of Polyepoxide A and 0.2 part of amine Catalyst A are mixed with 50 parts of Copolyester B in an agitated flask at 230°C under a nitrogen atmosphere. The preferred procedure consists of melting first the copolyester followed by the addition of the polyepoxide and finally the amine catalyst. The liquid mixture is agitated slowly for 18 minutes under these conditions. Properties are measured on slabs of 80 mil thickness which are prepared by compression molding at about 240°C and aftercuring at 100°C for 16 hours. Properties of the original copolyester and that mixed with the polyepoxide are tabulated below:

|  | Original Copolyester | Copolyester plus Polyepoxide A |
|---|---|---|
| Melt index 220°C,g/10 min. | 48.8 | 0.4 |
| COOH end group conc., meq/kg | 73.9 | nil |
| Tensile strength psi | 3000 | 5100 |
| Elongation at break, % | 460 | 700 |
| 100% Modulus, psi | 2250 | 2360 |
| 300% Modulus, psi | 2300 | 2410 |
| Trouser tear, pli | 260 | 430 |
| Shore D hardness | 55 | 55 |

Substantial increases in tensile strength, and tear strength are obtained as a result of the polyepoxide modification.

Above example was essentially repeated except that 0.5 part of Polyepoxide C was used instead of 1.0 part of Polyepoxide A. After mixing for 18 minutes at 230°C. the melt index measured at 220°C. was reduced from 48.8 to 13.4g/10 min. Aftercure for 16 hours at 100°C did not result in a lower melt index indicating that the reaction was essentially completed under the conditions employed. A similar improvement of physical properties was obtained as observed above.

Example 3

One part of Polyepoxide C is mixed with 100 parts of dried Copolyester C in an agitated flask at 250°C. for 15 minutes under a nitrogen atmosphere. The resulting polymer blend is then shredded and dried at 130°C/10 mm. Hg. for 2 hours and processed by injection molding on a 1-oz. ram-type machine (Imperial Injection Molder, Newbury Industries, Model H 1–30T) under the following conditions:

| | |
|---|---|
| Cylinder temperature (all zones): | 275°C. |
| Ram Pressure: | 7000 psi |
| Cycle time: | 2 min. |
| Average residence time/cycle | 9.5 min. |
| Mold temperature | 25°–35°C. |

The above injection molded parts are then recycled immediately after demolding. The conditions were selected to simulate the injection molding of large parts in commercial equipment.

As a control Copolyester C was processed under the same conditions as above without polyepoxide modification. The results obtained with the original copolyester and that compounded with polyepoxide are tabulated below:

|  | Original Copolyester | Copolyester plus Polyepoxide C |
|---|---|---|
| Melt index 220°C g./10 min. | | |
| Original polymer | 6.7 | 6.7 |
| After one cycle | 14.0 | 10.3 |
| After two cycles | 88.7 | 43.9 |

Carboxyl content, milliequivalents/kg.

|  |  |  |
|---|---|---|
| Original polymer | 27.9 | 27.9 |
| After 2 cycles | 61.0 | 40.0 |

The significantly improved melt stability of the polyepoxide modified copolyester is evident from the melt index data and the carboxyl content values. The higher molecular weight (lower melt index) of the polyepoxide containing polymer after injection molding results in improved physical properties such as tensile and tear strength as well as flex life. The lower carboxyl content manifests itself in improved aging characteristics of the polymer, especially in respect to hydrolytic stability.

Example 4

Polyepoxide C is compounded with Copolyester A as described in Example 1 in the amounts tabulated below:

|  | 4A | 4B |
|---|---|---|
| Copolyester A (parts) | 100 | 100 |
| Polyepoxide C (parts) | 1.0 | 2.0 |
| Catalyst A (parts) | 0.2 | 0.3 |

After shredding and drying of the compounded polymers, 80 mil slabs were compression molded at 240°C and cured for 20 hours at 100°C. The cured polymer was no longer thermoplastic and did not melt at 250°C. Properties of the original copolyester and those modified with polyepoxide are tabulated below:

|  | Original Copolyester | Polyepoxide Modified Copolyester | |
|---|---|---|---|
|  |  | 4A | 4B |
| Tensile strength, psi | 4600 | 5050 | 5000 |
| Elongation at break, % | 800 | 720 | 690 |
| 100% Modulus, psi | 850 | 1120 | 1210 |
| 100% Modulus, psi | 1100 | 1540 | 1825 |
| 500% Modulus, psi | 1700 | 2410 | 3000 |
| Trouser tear, pli | 240 | 228 | 195 |
| Hardness, Shore A | 91 | 90 | 92 |

The epoxide modification followed by curing resulted in a thermosetting polymer composition with the processing characteristics of a thermoplastic. Furthermore, substantial improvements in the moduli characteristics were obtained without increase in hardness.

What is claimed is:

1. A segmented thermoplastic copolyester composition consisting essentially of (a) a multiplicity of recurring long chain ester units and short chain ester units joined head-to-tail through ester linkages, said long chain ester units being represented by the formula I
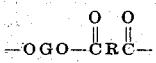

and said short chain units being represented by the formula

II
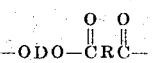

where G is a divalent radical remaining after the removal of terminal hydroxyl groups from a poly(alkylene oxide) glycol having a molecular weight of about 400–6,000 and a carbon to oxygen ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided said short chain ester units amount to about 15–95 percent by weight of said copolyester, and at least about 50 percent of said short chain ester units are identical and (b) from 0.5–10 equivalents, per equivalent of carboxyl group contained in said copolyester of a polyepoxide having a functionality of not less than about 2.

2. The composition of claim 1 wherein a maximum of 100 milliequivalents of carboxyl groups are present per kilogram of polymer.

3. The composition of claim 1 wherein the polyepoxide has an epoxide equivalent of about 50–2,000 and is represented by the general formula:

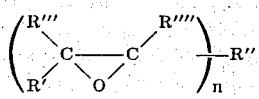

wherein $n$ has a value of about 2 to 15, $R'$, $R'''$ and $R''''$ are independently selected from the group consisting of hydrogen and lower alkyl, $R''$ is a polyvalent radical consisting essentially of C, H and O, and $R'$ and $R''$ may be joined to form a carboxylic ring.

4. The composition of claim 3 wherein $R''$ contains carbocyclic aromatic nuclei substituted with Cl or Br.

5. The composition of claim 3 wherein $R'''$ and $R''''$ are hydrogen, $n$ is 2 to 10 and the polyepoxide has an epoxide equivalent of about 75–1,000.

6. The composition of claim 3 wherein said polyepoxide is a polyglycidyl compound.

7. The composition of claim 1 wherein said polyepoxide is a diglycidyl ether of bisphenol A.

8. The composition of claim 1 wherein said copolyester also contains 0.05–0.5 weight percent, based on the weight of copolyester, of an epoxy catalyst.

9. The composition of claim 8 wherein said epoxy catalyst is a secondary aliphatic amine.

10. The composition of claim 9 wherein said secondary amine has a boiling point at least about as high as the melting point of said copolyester.

11. The composition of claim 1 wherein said dicarboxylic acid is selected from the group consisting of phthalic acid, terephthalic acid, isophthalic acid, their esters and mixtures thereof.

12. The composition of claim 1 wherein the poly(alkylene oxide) glycol is poly(tetramethylene oxide) glycol having a molecular weight of about 600–2,000.

13. The composition of claim 1 wherein said diol is 1,4-butanediol.

14. The composition of claim 1 wherein said polyepoxide is a polyglycidyl ether of a phenol-formaldehyde novolac.

15. The composition of claim 9 wherein said glycol is poly(tetramethylene oxide) glycol having a molecular weight of about 600–2,000, said dicarboxylic acid is dimethyl terephthalate and said diol is 1,4-butanediol.

16. The composition of claim 9 wherein said dicarboxylic acid is a mixture of dimethyl terephthalate and a maximum of 30 mole percent of dimethyl isophthalate, dimethyl phthalate or mixtures thereof.

* * * * *